(12) United States Patent
Ehlers et al.

(10) Patent No.: US 7,946,930 B1
(45) Date of Patent: *May 24, 2011

(54) FACE STRUCTURE FOR A GOLF CLUB HEAD

(75) Inventors: Steven M. Ehlers, Poway, CA (US);
John B. Kosmatka, Encinitas, CA (US);
Anthony V. Nigro, Oceanside, CA (US);
Matthew J. Erickson, San Diego, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/015,234

(22) Filed: Jan. 27, 2011

Related U.S. Application Data

(63) Continuation of application No. 12/686,208, filed on Jan. 12, 2010, now Pat. No. 7,878,922, which is a continuation of application No. 12/416,825, filed on Apr. 1, 2009, now Pat. No. 7,645,201, which is a continuation of application No. 11/209,244, filed on Aug. 22, 2005, now Pat. No. 7,527,565, which is a continuation-in-part of application No. 10/249,715, filed on May 2, 2003, now Pat. No. 6,932,716, which is a continuation-in-part of application No. 10/063,680, filed on May 7, 2002, now Pat. No. 6,607,451, which is a continuation of application No. 09/551,284, filed on Apr. 18, 2000, now Pat. No. 6,390,932.

(51) Int. Cl.
*A63B 53/04* (2006.01)
(52) U.S. Cl. .......... 473/329; 473/345; 473/349
(58) Field of Classification Search .......... 473/324–350, 473/287–292
See application file for complete search history.

(56) References Cited

U.S. PATENT DOCUMENTS

| | | | | |
|---|---|---|---|---|
| 5,322,287 | A * | 6/1994 | Okumoto et al. | 473/347 |
| 6,776,726 | B2 * | 8/2004 | Sano | 473/330 |
| 6,932,716 | B2 * | 8/2005 | Ehlers et al. | 473/329 |
| 7,527,565 | B1 * | 5/2009 | Ehlers et al. | 473/329 |
| 7,645,201 | B2 * | 1/2010 | Ehlers et al. | 473/329 |
| 7,878,922 | B2 * | 2/2011 | Ehlers et al. | 473/329 |

* cited by examiner

*Primary Examiner* — Sebastiano Passaniti
(74) *Attorney, Agent, or Firm* — Michael A. Catania; Rebecca Hanovice

(57) ABSTRACT

A golf club head having a multiple material face is disclosed herein. The golf club head has a coefficient of restitution value greater than 0.83 and a characteristic time value of less than 257 milliseconds. The golf club head is preferably composed of a titanium alloy with a polymer layer disposed over a titanium alloy front wall. A preferred polymer is a polyurethane polymer.

5 Claims, 12 Drawing Sheets

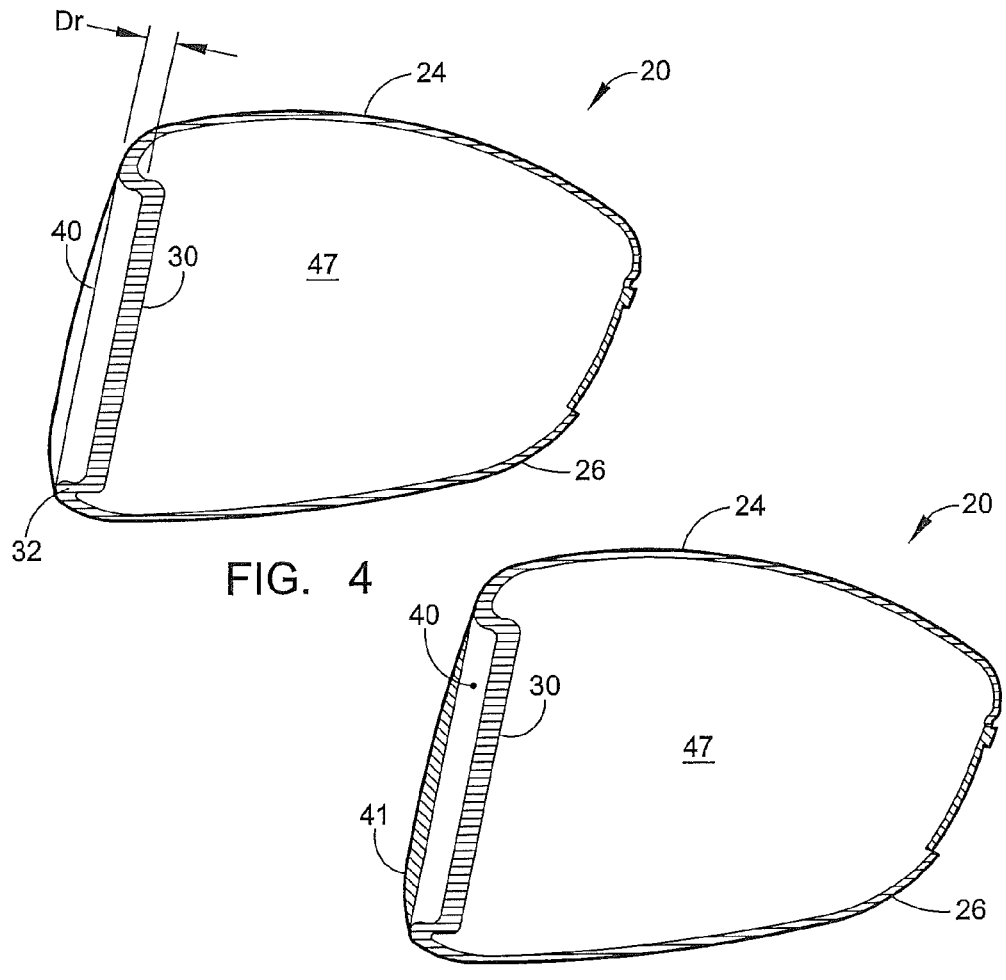
FIG. 4
FIG. 4A
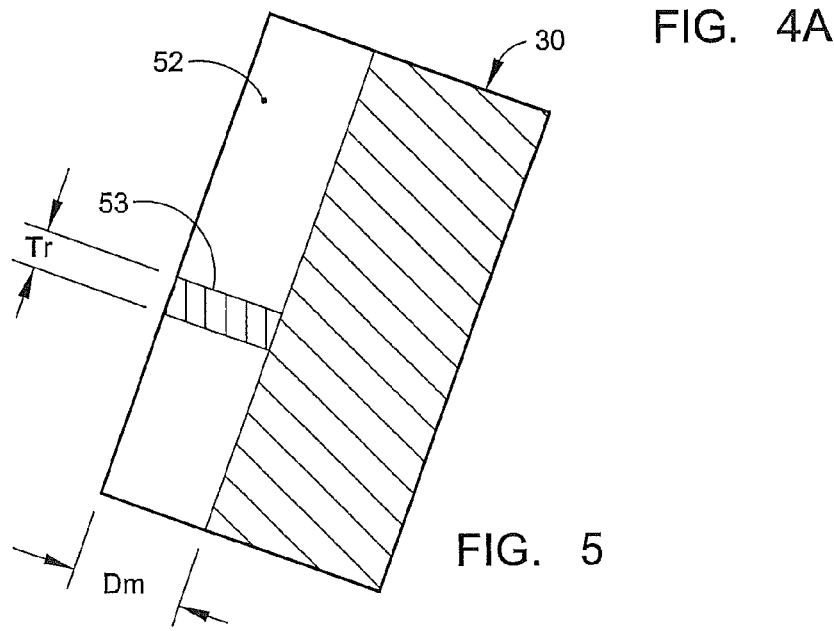
FIG. 5

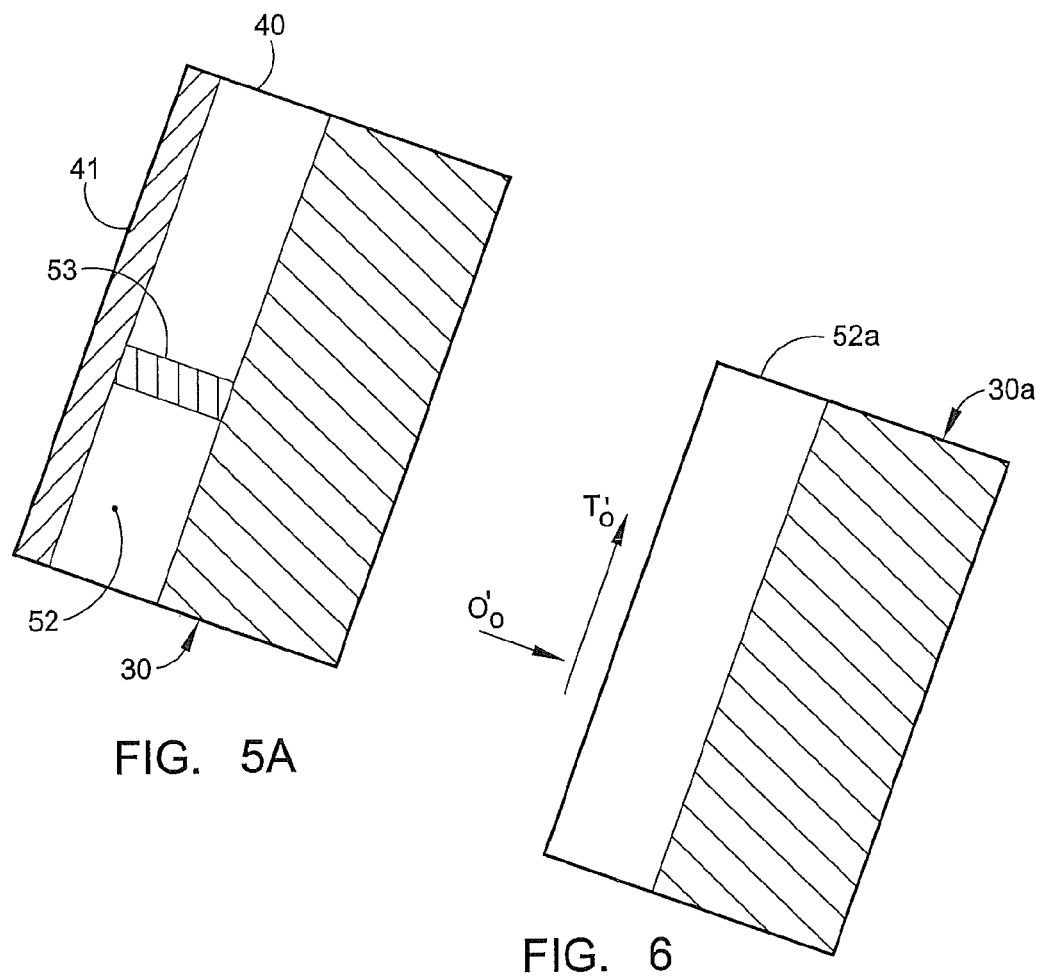
FIG. 5A
FIG. 6
(PRIOR ART)
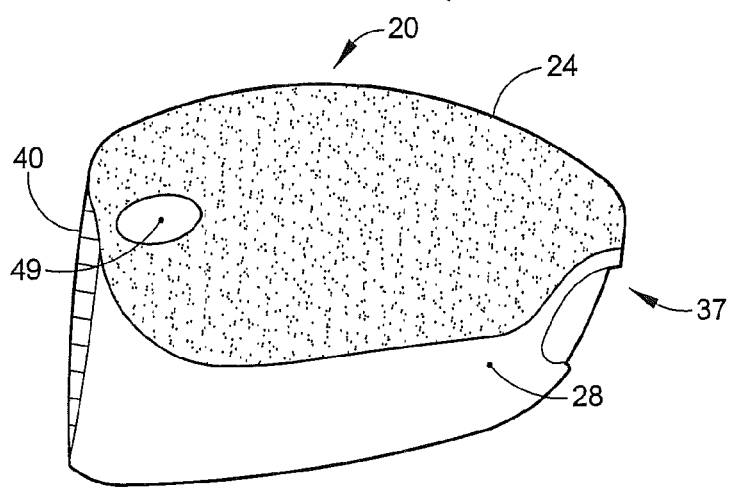
FIG. 7

FACE STRUCTURE FOR A GOLF CLUB HEAD

CROSS REFERENCES TO RELATED APPLICATIONS

The present application is a continuation application of U.S. patent application Ser. No. 12/686,208, filed on Jan. 12, 2010, which is a continuation application of U.S. patent application Ser. No. 12/416,825, filed on Apr. 1, 2009, now U.S. Pat. No. 7,645,201, which is continuation application of U.S. patent application Ser. No. 11/209,244, filed on Aug. 22, 2005, now U.S. Pat. No. 7,527,565, which is a continuation-in-part application of U.S. patent application Ser. No. 10/249,715, filed on May 2, 2003, now U.S. Pat. No. 6,932,716, which is a continuation-in-part application of U.S. patent application Ser. No. 10/063,680, filed on May 7, 2002, now U.S. Pat. No. 6,607,451, which is a continuation application of U.S. patent application Ser. No. 09/551,284, filed on Apr. 18, 2000, now U.S. Pat. No. 6,390,932.

STATEMENT REGARDING FEDERALLY SPONSORED RESEARCH OR DEVELOPMENT

Not Applicable

BACKGROUND OF THE INVENTION

1. Field of the Invention

The present invention relates to a method and apparatus for forming a face structure for a golf club head. More specifically, the present invention relates to a method and apparatus for fowling a face structure composed of an interconnected reinforcement piece and a polymer material.

2. Description of the Related Art

Technical innovation in the material, construction and performance of golf clubs has resulted in a variety of new products. The advent of metals as a structural material has largely replaced natural wood for wood-type golf club heads, and is but one example of this technical innovation resulting in a major change in the golf industry. In conjunction with such major changes are smaller scale refinements to likewise achieve dramatic results in golf club performance. For example, the metals comprising the structural elements of a golf club head have distinct requirements according to location in the golf club head. A sole or bottom section of the golf club head should be capable of withstanding high frictional forces for contacting the ground. A crown or top section should be lightweight to maintain a low center of gravity. A front or face of the golf club head should exhibit high strength and durability to withstand repeated impact with a golf ball. While various metals and composites are known for use in the face, several problems arise from the use of traditional face structure and materials. In addition, material interaction of the golf club head and the golf ball during impact is an important factor for performance of the golf club.

The golf ball is typically composed of a core-shell arrangement with a thin polymer shell, or cover material such as ionomers, surrounding a rubber-like core. These polymeric materials exhibit compression and shear, stiffness and strength properties dependent upon strain (load), input frequency (time dependency of small linear strain), strain rate (time rate of loading including large nonlinear strains), and temperature. The compression and shear stiffness properties of polymeric materials are measured and classified in terms of a storage moduli (E', G') and a loss moduli (E", G"), respectively. The storage moduli (E', G') represent the amount of compression and shear energy, respectively, stored during a complete loading cycle. For quasi-static loading, it is equivalent to the well known Young's modulus (E'=E) and shear modulus (G'=G=E/(2(1+v)), where (v) is the material Poisson ratio. For most polymers, the storage modulus increases significantly with strain, input frequency, and strain rate. For example, typical storage moduli for golf balls at low speed impacts, in the temperature range (50-100° F.), are $E'_{ball}$=450-6,000 lb/in$^2$ and $G'_{ball}$=150-2,000 lb/in$^2$. During high-speed impacts, in the temperature range (50-100° F.), the typical storage moduli are $E'_{ball}$=9,000-50,000 lb/in$^2$ and $G'_{ball}$=3,000-16,500 lb/in$^2$. The low speed impact represents a putting stroke or a soft pitch shot, while the high-speed impact represents a golf swing with an iron-type or a wood-type golf club head.

The loss moduli (E", G") represent the amount of compression and shear energy, respectively, dissipated during a cycle. For most polymers, the loss moduli also increase significantly with strain, input frequency, and strain rate, but the rate of increase can be very different than the aforementioned storage moduli. Finally, the magnitude of the loss moduli at a given strain, strain rate, frequency, or temperature typically vary from 0.005-2.0 times that of the storage moduli.

A loss (or damping) factor ($\eta_E$, $\eta_G$) or loss angle ($\delta_E$, $\delta_G$) for compression and shear are commonly defined as the ratio of the corresponding moduli;

$$\eta_E = \mathrm{Tan}\delta_E = \frac{E''}{E'}, \eta_G = \mathrm{Tan}\delta_G = \frac{G''}{G'}.$$

These loss factors are an important measure of the damping capability (energy loss mechanisms) of the material. For most ball-type materials, ($\eta_E \cong \eta_G$) and magnitudes fall in the range of 0.005 (low energy loss) to 2.0 (high-energy losses), where magnitudes clearly depend upon polymer composition, strain, input frequency, strain rate, and temperature. As a comparison, the loss factors (energy loss mechanisms) in a metallic face of a golf club head are on the order of 10-100 times smaller than that of a golf ball. For most elastomeric polymer materials operating below the glass transition region, the Poisson ratio is fairly constant with (v=0.4-0.5), while for stiff polymers acting at or above the glass transition region (v=0.3-0.33).

Thus, during impact of the golf ball with the golf club head, a significant portion of impact energy is lost as a result of the large deformations (0.05 to 0.50 inches) and deformation rates of the high damped golf ball materials, as opposed to the small deformations of the low damped metallic club face (0.025 to 0.050 inches) materials. A larger portion of this impact energy is lost in the golf ball because the magnitude of the deformation, the deformation rate, and energy loss mechanisms are greater for the golf ball than the face of the golf club head.

Application of hard polymers to the face of the golf club head represents a traditional structure of natural wood golf club heads, where a hard insert material centrally located in the face of the golf club and requiring an exacting fit between two or more distinct elements. The hard insert must be manufactured to a close tolerance to fit within a recess in the face of the golf club, and high surface hardness is less efficient in transferring energy to the golf ball during impact with the golf club. A homogeneous face structure is simpler to manufacture but is limited to the inherent material properties of the single material comprising the face structure. The present invention achieves a more efficient energy transfer during impact while maintaining a simple construction.

The use of a polymer coating or layer on the face of a metal driver has been shown to increase durability and the coefficient of restitution ("COR") of the driver through the compliance of the polymer layer. However, when a golf ball impacts the face at angles that are not normal to face, such as the case with lofted drivers, shear deformation of the polymer coating introduces energy losses that reduce or eliminate the COR benefit provided by the polymer coating.

The United States Golf Association ("USGA") has set forth a test for determining the flexibility of a golf club head. The test procedure is available at www.USGA.org under Procedure For Measuring The Flexibility Of A Golf Clubhead. The test uses a pendulum testing apparatus to determine the characteristic time ("CT") between a clubhead and a pendulum during impact. In order to be in conformity with the Rule of Golf as set forth and interpreted by the USGA, the CT must not be greater than 239 milliseconds plus a tolerance of 18 milliseconds for a total of 257 milliseconds. U.S. Pat. No. 6,505,498 and U.S. Patent Publication Number 2004/0182131 each disclose a pendulum testing apparatus which may be used to determine the CT of a clubhead.

The CT test replaces a coefficient of restitution ("COR") test that was previously used by the USGA to render decisions on the conformity or non-conformity of golf club drivers. The COR test had a limit of 0.83.

BRIEF SUMMARY OF THE INVENTION

The present invention provides a wood-type golf club head that has a COR greater than or equal to 0.83 and a CT less than or equal to 257 milliseconds.

One aspect of the present invention is a wood-type golf club head with a polymer layer disposed on the front wall of a body of the wood-type golf club head. The polymer layer preferably comprises a reinforcement structure and a polymer material. The wood-type golf club head that has a COR greater than or equal to 0.83 and a CT less than or equal to 250 milliseconds.

Another aspect of the present invention is a golf club head comprising a body and a polymer layer. The body comprises a crown, a sole and a front wall. The body has a hollow interior. The body preferably has a volume ranging from 300 cubic centimeters to 500 cubic centimeters. The body is preferably composed of a titanium alloy material. The front wall has a recess having a depth ranging from 0.040 inch to 0.250 inch. The polymer layer is disposed within the recess of the front wall. The polymer layer comprises a polymer material with an integrated reinforcement structure composed of interconnected hexagonal cells. Each hexagonal cell has a cell size of 0.0625 inch to 0.100 inch. The polymer layer has a thickness ranging from 0.040 inch to 0.250 inch. The golf club head has a moment of inertia, Izz, about the Z axis of the center of gravity of the golf club head ranging from 2700 g-cm$^2$ to 4000 g-cm$^2$. The golf club head has a coefficient of restitution value greater than or equal to 0.83 and a characteristic time value of less than 257 milliseconds.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 4 is a cross-sectional view of the wood-type golf club head of FIG. 1 taken along line 4-4 of FIG. 3.

FIG. 4A is a cross-sectional view of an alternative embodiment of a wood-type golf club head.

FIG. 5 is an enlarged isolated view of a matrix layer and a front wall.

FIG. 5A is an enlarged isolated view of the alternative embodiment of FIG. 4A.

FIG. 6 is an enlarged isolated view of a prior art polymer layer disposed on a front wall of a loft driver to illustrate the shear deformation during impact with a golf ball.

FIG. 7 is a heel-side view of the wood-type golf club head of FIG. 1.

DETAILED DESCRIPTION OF THE INVENTION

Figure 1:
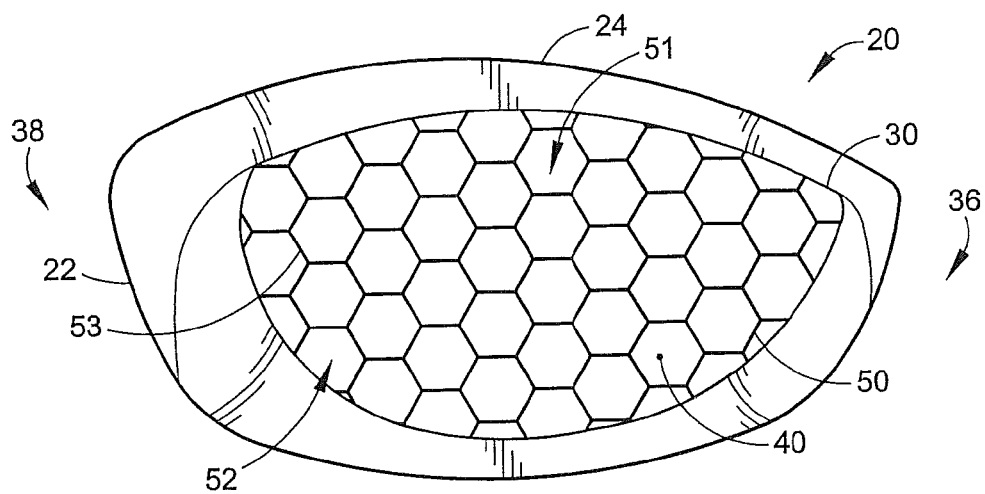
FIG. 1 is a front view of a wood-type golf club head with a matrix layer.

As shown in FIGS. 1-10, the golf club head of the present invention is generally designated 20. The golf club head 20 of FIGS. 1-10 is a driver, however, the golf club head of the present invention may alternatively be a fairway wood. The golf club head 20 has a body 22 that is preferably composed of a metal material such as titanium, titanium alloy, or the like, and is most preferably composed of a cast titanium alloy material. The body 22 is preferably cast from molten metal in a method such as the well-known lost-wax casting method. The metal for casting is preferably titanium or a titanium alloy such as 6-4 titanium alloy, alpha-beta titanium alloy or beta titanium alloy for forging, and 6-4 titanium for casting. Alternatively, the body 22 is composed of 17-4 steel alloy. Additionally, methods for manufacturing the body 22 include forming the body 22 from a flat sheet of metal, super-plastic forming the body 22 from a flat sheet of metal, machining the body 22 from a solid block of metal, electrochemical milling the body from a forged pre-form, casting the body using centrifugal casting, casting the body using levitation casting, and like manufacturing methods.

The golf club head 20, when designed as a driver, preferably has a volume from 200 cubic centimeters to 600 cubic centimeters, more preferably from 300 cubic centimeters to 450 cubic centimeters, and most preferably from 350 cubic centimeters to 420 cubic centimeters. A golf club head 20 for a driver with a body 22 composed of a cast titanium alloy most preferably has a volume of 380 cubic centimeters. The volume of the golf club head 20 will also vary between fairway woods (preferably ranging from 3-woods to eleven woods) with smaller volumes than drivers.

The golf club head 20, when designed as a driver, preferably has a mass no more than 215 grams, and most preferably a mass of 180 to 215 grams. When the golf club head 20 is designed as a fairway wood, the golf club head preferably has a mass of 135 grams to 180 grams, and preferably from 140 grams to 165 grams.

The body 22 has a crown 24, a sole 26, a ribbon 28, and a multiple material front wall 30. The body 22 optionally has a recess 32 in the front wall 30. The recess 32 preferably has a depth, "Dr", as shown in FIG. 4, that ranges from 0.040 inch to 0.250 inch, more preferably from 0.080 inch to 0.120 inch, and is most preferably 0.100 inch. The body 22 preferably has a hollow interior 47. The golf club head 20 has a heel end 36, a toe end 38 an aft end 37. A shaft, not shown, is placed within a hosel 49 at the heel end 36. In a preferred embodiment, the hosel 49 is internal to the body 22, and the shaft extends to the sole 26.

Figure 13:
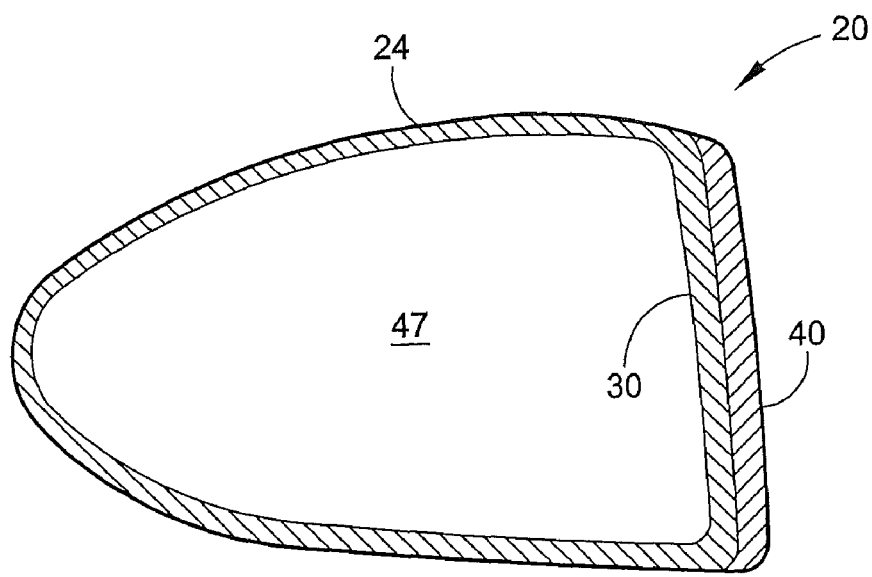
FIG. 13 is cross-sectional view of an alternative embodiment of a wood-type golf club head with a multiple material face.

The golf club head 20 preferably has a polymer layer 40 that is disposed on the front wall 30 of the body 22. In a preferred embodiment, the polymer layer 40 is an insert that is disposed in the recess 32 of the front wall 30. In an alternative embodiment shown in FIG. 13, the polymer layer 40 is disposed on the exterior surface of the front wall 30. A more detailed description of a golf club head 20 with a polymer layer disposed on the front wall is disclosed in U.S. Pat. No. 6,607,451, for A Compliant Polymer Face Golf Club Head, which is hereby incorporated by reference in its entirety. Yet another detailed description of a golf club head 20 with a polymer layer disposed on the front wall is disclosed in U.S. Pat. No. 6,428,427, for A Golf Club Head With Coated Striking Plate, which is also hereby incorporated by reference in its entirety.

Figure 2:
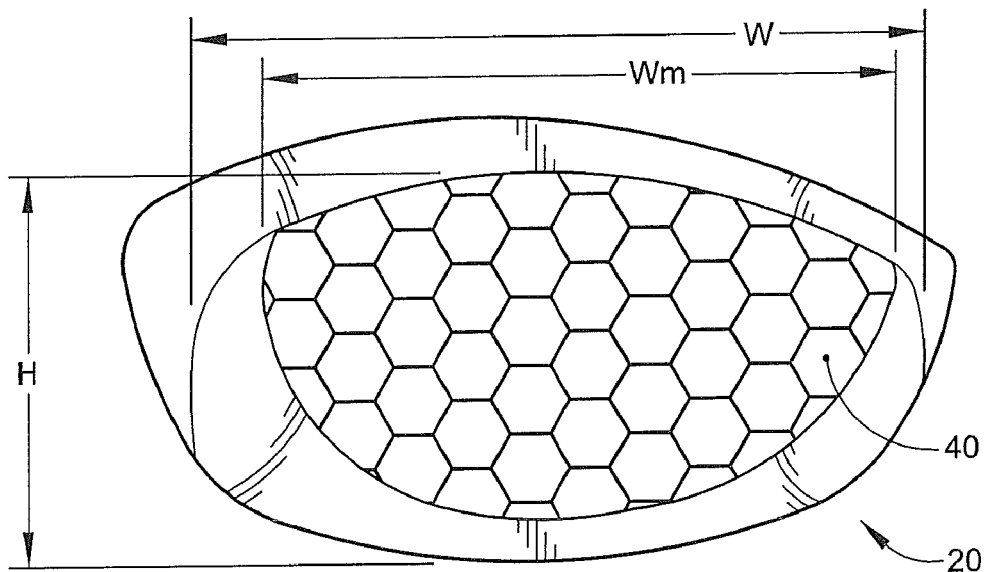
FIG. 2 is a front view of a wood-type golf club head illustrating height and width measurements.

The polymer layer 40 is preferably composed of a reinforcement structure 50 and a polymer material 52. As shown in FIG. 2, the polymer layer 40 has a width Wm that preferably ranges from 2.0 inches to 4.0 inches. In a preferred embodiment, the polymer layer 40 has an uniform thickness that ranges from 0.040 inch to 0.250 inch, more preferably a thickness of 0.080 inch to 0.120 inch, and is most preferably 0.100 inch.

The polymer material 52 for the polymer layer 40 is preferably a thermoplastic polyurethane material. Polymer materials that may be utilized in the polymer layer 40 include: polymers from Bayer Corporation sold under the TEXIN brand such as TEXIN 4215, TEXIN 4210, TEXIN 270, TEXIN 4210 T2, TEXIN 270 T2, TEXIN 4215 T2 and TEXIN 4215 T3, which are thermoplastic polyurethanes and thermoplastic polyurethane and polycarbonate blends; polymers from BASF corporation such as TERLURAN EGP-7, TERLURAN HI-10, TERLURAN GP-22, which are ABS polymers, ULTRAMID A3HG5, LURANS 778 T1 and LURAN S 778 T/TE T2, which are ABS and polyamide blends, and TRIAX 1120, which is an ABS and polyamide blend; polymers from Du Pont Chemicals such as HYTREL 7246 thermoplastic polyester elastomer and HYLENE 58D polymer and SURLYN ionomers; polymers from GE Polymers such as NORYL PPX/PPX7115 polyphenylene ether and polystryene blend, LEXAN EXL 1330 T2, LEXAN EXL 1330 T3, LEXAN ML 6143/C1000, LEXAN 1330/ML6143, LEXAN ML6143H and LEXAN 1330, which are amorphous thermoplastic polymers, CYCOLOY C1000HF T1, CYCOLOY C1000HF T2, CYCOLOY C1000HF T3, CYCOLOY C1000HF T4 AND CYCOLOY C1000HF T5, which are ABS and polycarbonate blends; polymers from Atofina corporation sold under the brands ATOFINA 3429, ATOFINA 3467 and ATOFINA 7823 MZ; polymers from BP Chemical sold under the brand BAREX 210, which is an E acrylonitrile-methyl acrylate copolymer; polymers from Chevron corporation sold under the brands BK-12, KR03 and BK10/NAS90 blend; polymers from Exxon Mobil chemical sold under the brands PP1024E4, PP1043N, PP7033N, PP7032E2T1, PP7032KN and PP7032E2T2; polymers from Huntsman Chemical sold under the brand IROGRAN 113557; polymers from RTP corporation sold under the brands 1299-A 80D w/glass, 1299-B 80D without glass, RTP 4085 and Nylon 6 with nano; and polymers from Uniroyal sold under the brand AN2501750 blend T1, AN2501750 blend T2 and LF750D.

In a preferred embodiment, the polymer material 52 is preferably injection molded or compression molded around the reinforcement structure 50. However, those skilled in the pertinent art will recognize that other integration methods may be utilized in combining the reinforcement structure 50 and the polymer material 52 without departing from the scope and spirit of the present invention. The polymer layer 40 is applied to the front wall 30 of the golf club head 20. One application method is to use an adhesive to adhere an interior surface of the polymer layer 40 to the exterior surface of the front wall 30 within the recess 32. Another method is to use compressive forces to apply the polymer layer 40 within the recess 32. Yet another method is to use bolts to secure the polymer layer 40 within the recess 32. Yet a further method is to form the polymer layer 40 within the recess 32. However, those skilled in the pertinent art will recognize other methods to place the polymer layer 40 on the front wall 30 of the golf club head 20 without departing from the scope and spirit of the present invention.

The reinforcement structure 50 is preferably composed of aluminum, aramid fiber, fiberglass, carbon or a rigid polyurethane material, and such reinforcement structures are available from Hexcel Corporation of Pleasanton, Calif. under the brand HEXCEL COMPOSITES. The reinforcement structure 50 is preferably a plurality of interconnected cells 51, with each cell 51 preferably having a cell size ranging from 0.010 inch to 0.375 inch, more preferably from 0.0625 inch to 0.125 inch. Each cell 51 is preferably formed of integrated walls 53. As shown in FIG. 5, the reinforcement structure 50 preferably has a depth that extends along the entire depth, "Dm", of the polymer layer 40. In an alternative embodiment, the reinforcement structure 50 has a depth that partially extends along the depth of the polymer layer 40, ranging from 25% to 75% of the depth of the polymer layer 40. As shown in FIG. 5, each of the walls 53 of the reinforcement structure 50 preferably has a thickness, "Tr", ranging from 0.0005 inch to 0.01 inch, more preferably from 0.001 inch to 0.005 inch, and most preferably 0.002 inch.

In an alternative embodiment shown in FIGS. 4A and 5A, an outer layer 41 covers the polymer layer 40. The outer layer 41 provides additional protection to the polymer layer 40 during impact with a golf ball. The outer layer may be composed of any of the previously disclosed polymer materials. Further, the outer layer 41 preferably has a thickness ranging from 0.005 inch to 0.100 inch. In a most preferred embodiment, the outer layer 41 is composed of the same material as the polymer material 52 of the polymer layer 40.

Figure 1A:
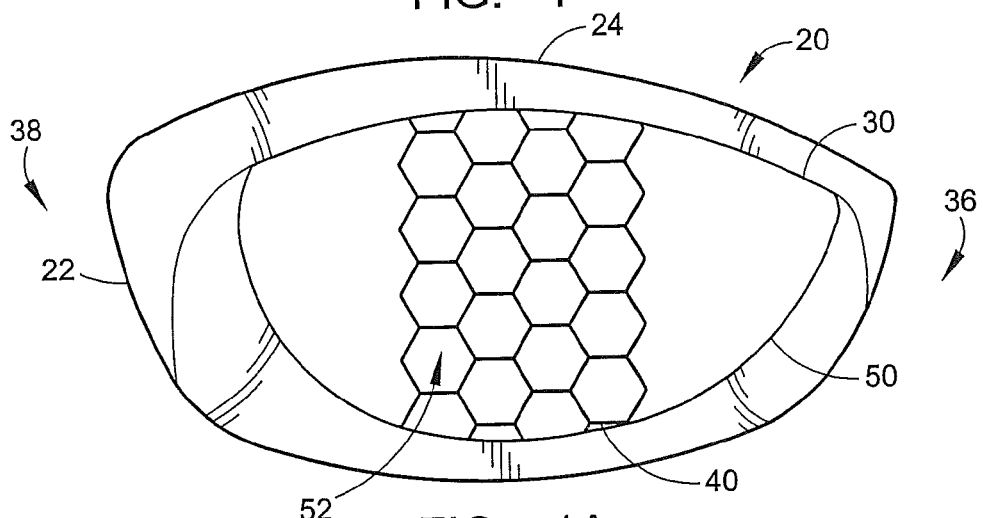
FIG. 1A is a front view of a wood-type golf club head with an alternative matrix layer.
Figure 1B:
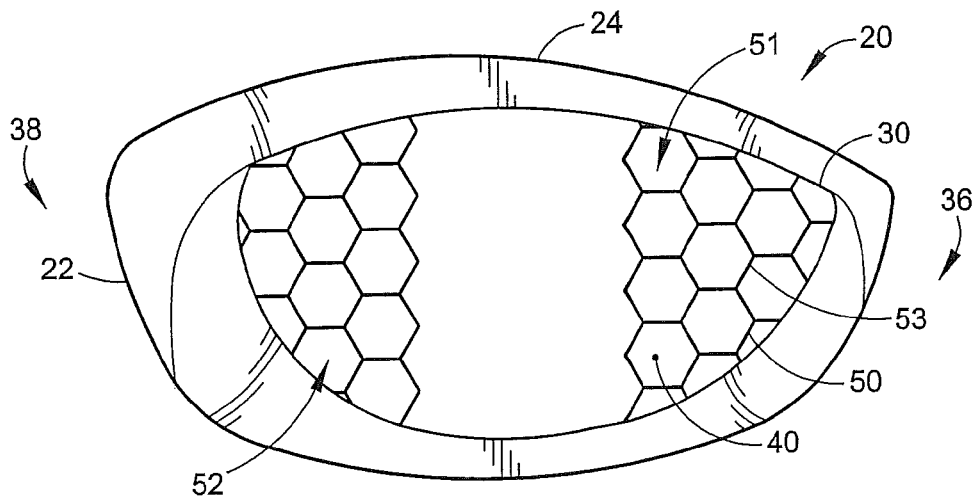
FIG. 1B is a front view of a wood-type golf club head with an alternative matrix layer.

As shown in FIGS. 1A and 1B, alternative embodiments of the polymer layer 40 have a reinforcement structure 50 that is only present in a portion of the polymer layer 40. In FIG. 1A, the reinforcement structure is only disposed in the center of the face of the golf club head 20 in accordance with high impact probability locations. In FIG. 1B, the reinforcement structure is absent from the center of the face 45 of the golf club head 20.

Figure 11:
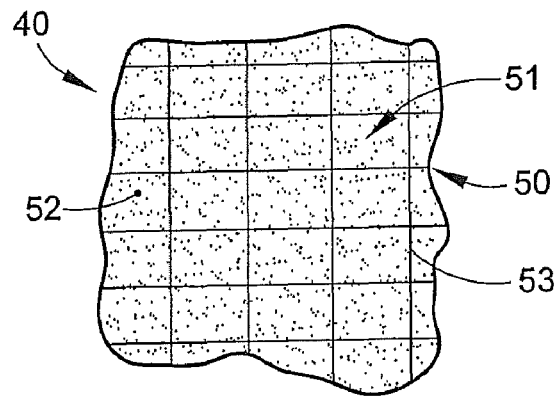
FIG. 11 illustrates an alternative embodiment of a matrix layer.
Figure 12:
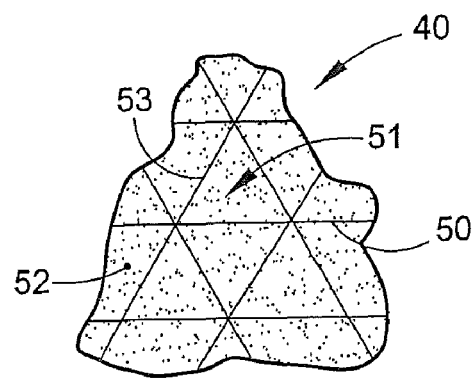
FIG. 12 illustrates an alternative embodiment of a matrix layer.

FIGS. 11 and 12 illustrate various grid formations of the reinforcement structure 50. FIG. 11 has a rectangular grid formation and FIG. 12 has a triangular grid formation. A preferred embodiment has a hexagonal grid formation, as shown in FIG. 1. Those skilled in the pertinent art will recognize that other grid formations may be used for the reinforcement structure 50 of the matrix layer 40 without departing from the scope and spirit of the present invention.

As shown in FIG. 6, a lofted driver with a polymer layer 52a on the front wall 30a will experience a shear stress, $\tau_o$, from the normal stress, $\sigma_o$, due to impact with a golf ball. The shear stress causes shear deformation of the polymer layer 52a thereby affecting the normal compliance of the polymer layer 52a, which reduces the increased COR due to the polymer layer 52a. The reinforcement structure 50 of the polymer layer 40 reduces or eliminates the shear deformation of the polymer material 52 thereby allowing for increased COR and durability.

The wood-type golf club head 20 preferably has a high coefficient of restitution thereby enabling for greater distance of a golf ball hit with the golf club head of the present invention. The coefficient of restitution (also referred to herein as "COR") is determined by the following equation:

$$e = \frac{v_2 - v_1}{U_1 - U_2}$$

wherein $U_1$ is the club head velocity prior to impact; $U_2$ is the golf ball velocity prior to impact which is zero; $v_1$ is the club head velocity just after separation of the golf ball from the face of the club head; $v_2$ is the golf ball velocity just after separation of the golf ball from the face of the club head; and e is the coefficient of restitution between the golf ball and the club face.

Figure 14:
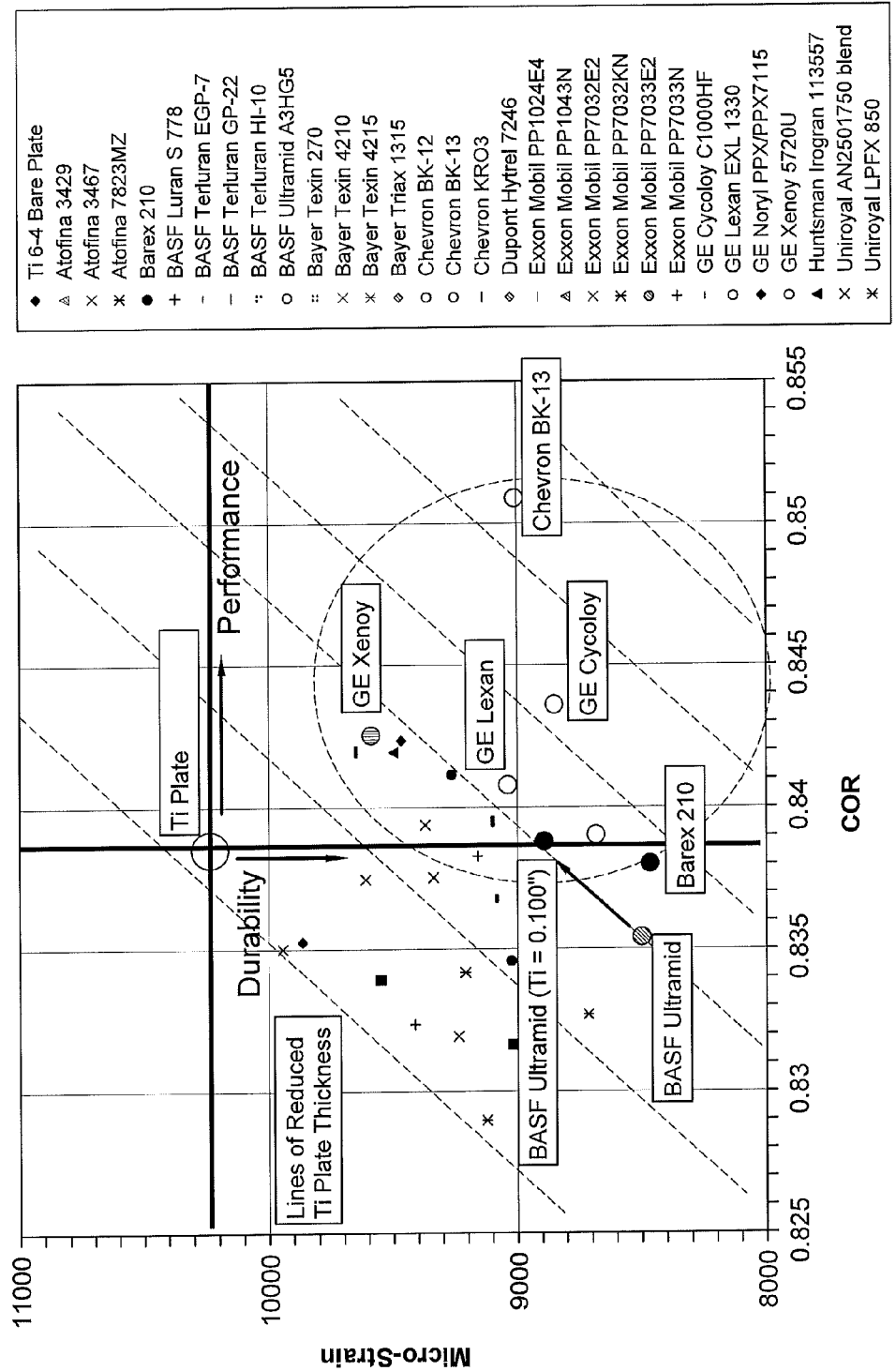
FIG. 14 is a graph of micro-strain (y-axis) versus coefficient of restitution (x-axis) at 85 miles per hour for titanium plates coated with commercially available polymers.
Figure 15:
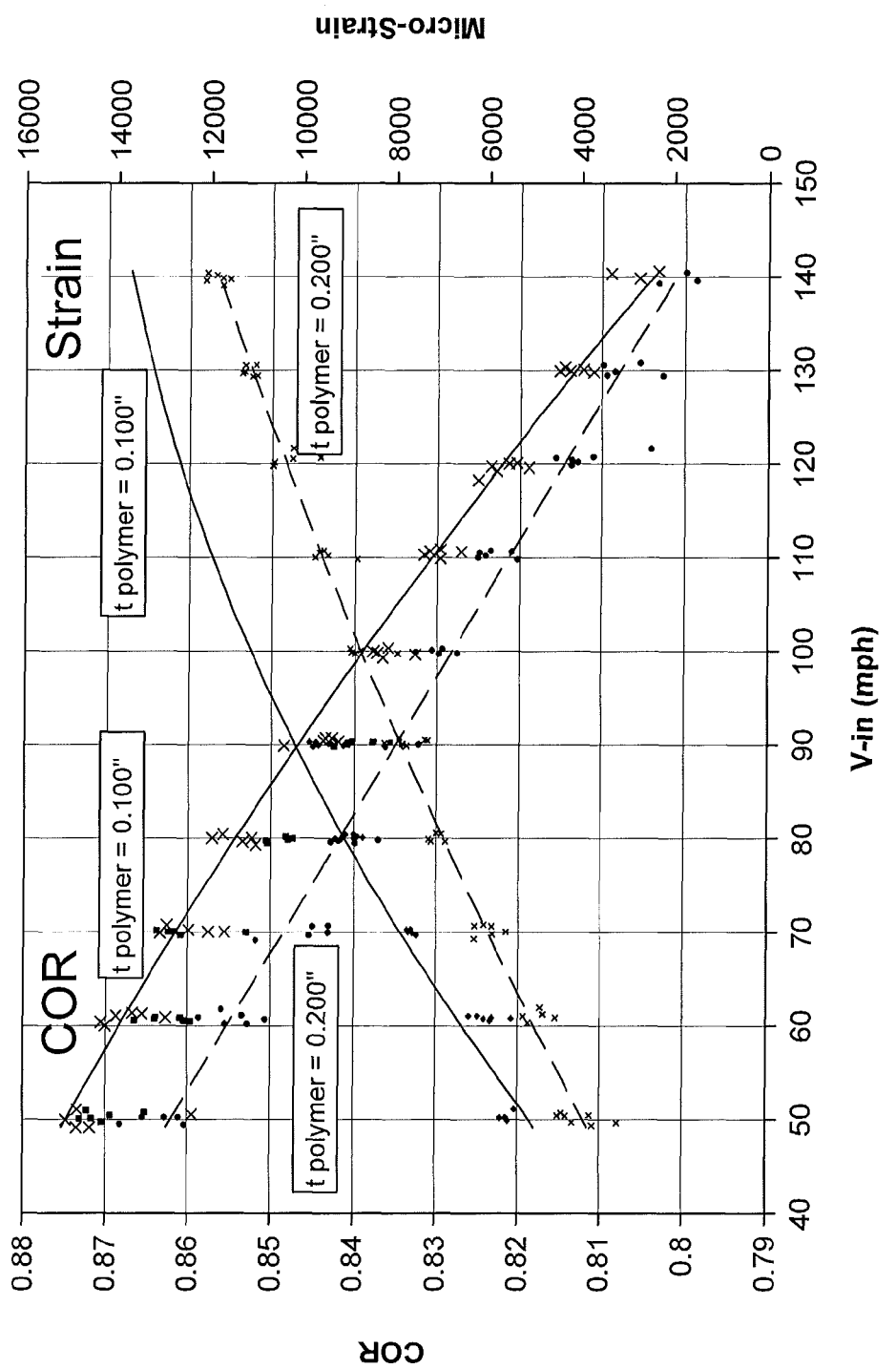
FIG. 15 is a graph of micro-strain (y-axis) and coefficient of restitution (y-axis) versus incoming velocity (x-axis) in miles per hour for titanium plates having a polymer layer.

The values of e are limited between zero and 1.0 for systems with no energy addition. The coefficient of restitution, e, for a material such as a soft clay or putty would be near zero, while for a perfectly elastic material, where no energy is lost as a result of deformation, the value of e would be 1.0. The present invention provides a wood-type golf club head 20 preferably having a coefficient of restitution preferably ranging from 0.80 to 0.87, and more preferably from 0.82 to 0.86, as measured under standard USGA test conditions. FIGS. 14 and 15 illustrate the COR values for club heads with polymer layers.

Figure 16:
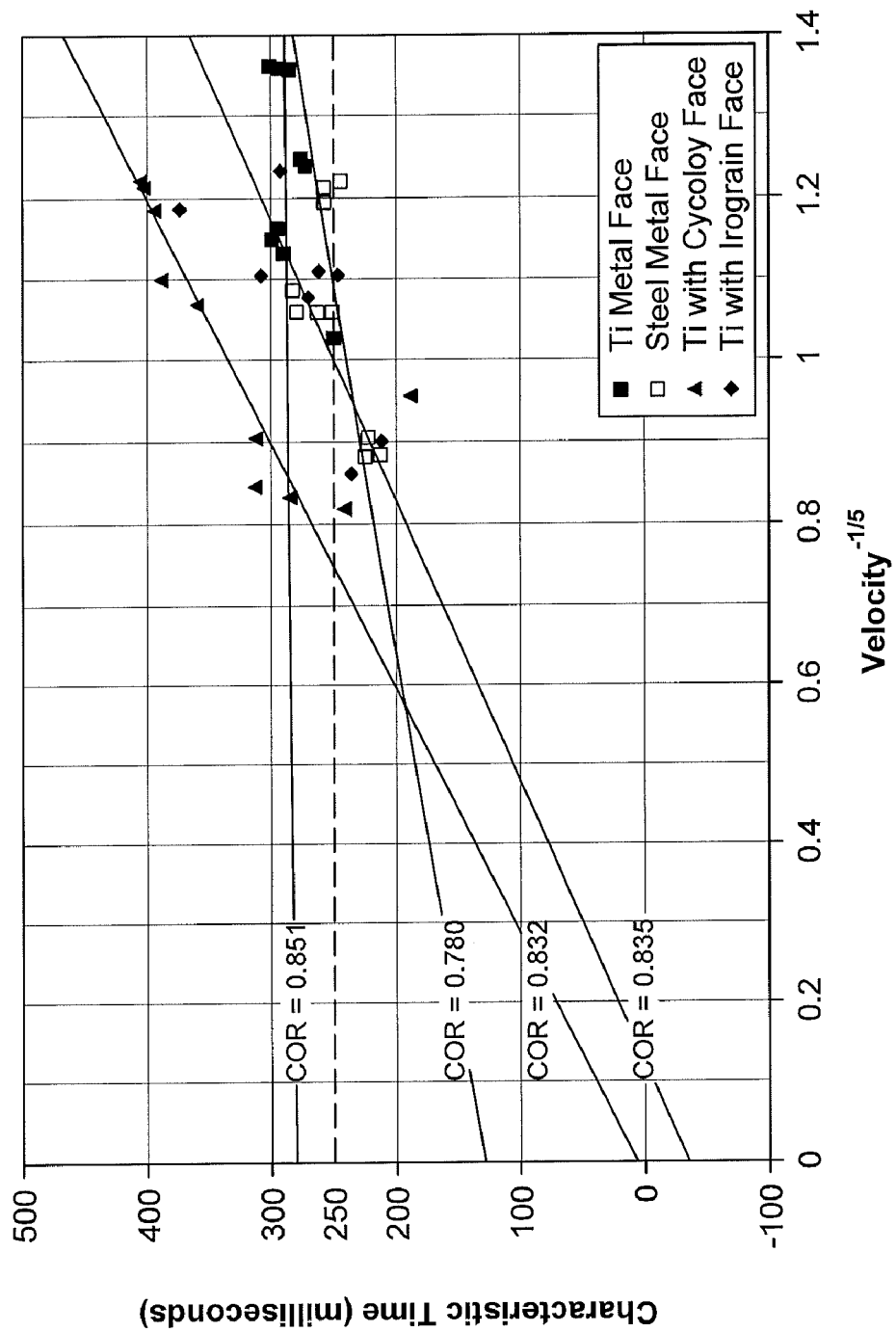
FIG. 16 is a graph of characteristic time (y-axis) versus velocity$^{-1/5}$ (x-axis) for golf club heads having multiple material faces and single material faces.

The wood-type golf club head 20 preferably has a CT value, under standard USGA conditions which are hereby incorporated by reference in their entirety, that is equal to or less than 257 milliseconds at 1 meter/second. As shown in FIG. 16, a CALLAWAY GOLF® ERC® II Driver, which is a clubhead with a forged titanium alloy face, has a COR of 0.851 (squares) and has a CT value greater than 257 milliseconds. A CALLAWAY GOLF® STEELHEAD® Driver, which is a clubhead with a stainless steel face, has a COR of 0.780 (circles) and a CT value less than 257 milliseconds. A clubhead of the present invention (triangles) with a multiple material face (titanium alloy front wall covered with a cycoloy polymer layer) has a COR of 0.832 and a CT value less than 257 milliseconds. A clubhead of the present invention (diamonds) with a multiple material face (titanium alloy front wall covered with an Irograin polymer layer) has a COR of 0.835 and a CT value less than 257 milliseconds.

Figure 17:
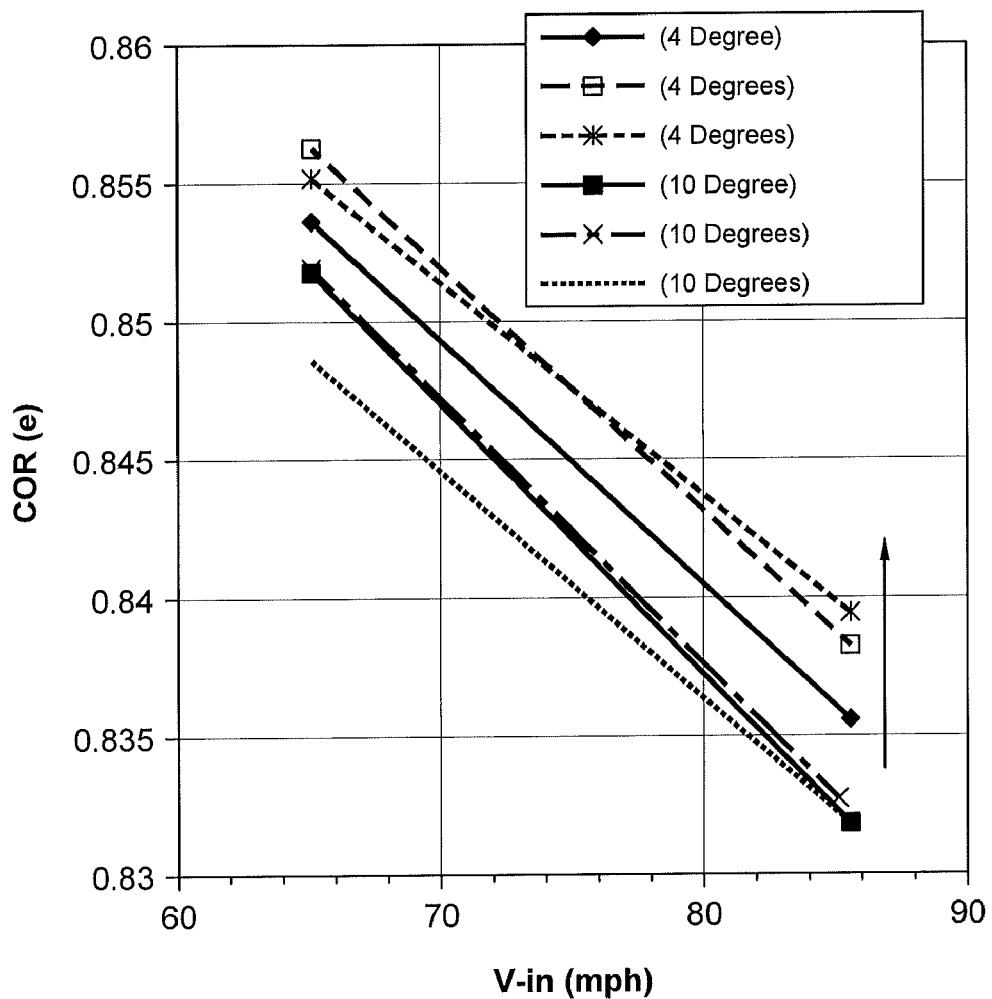
FIG. 17 is a graph of coefficient of restitution (y-axis) versus incoming velocity (x-axis) in miles per hour for multiple material faces having a matrix layer.
Figure 18:
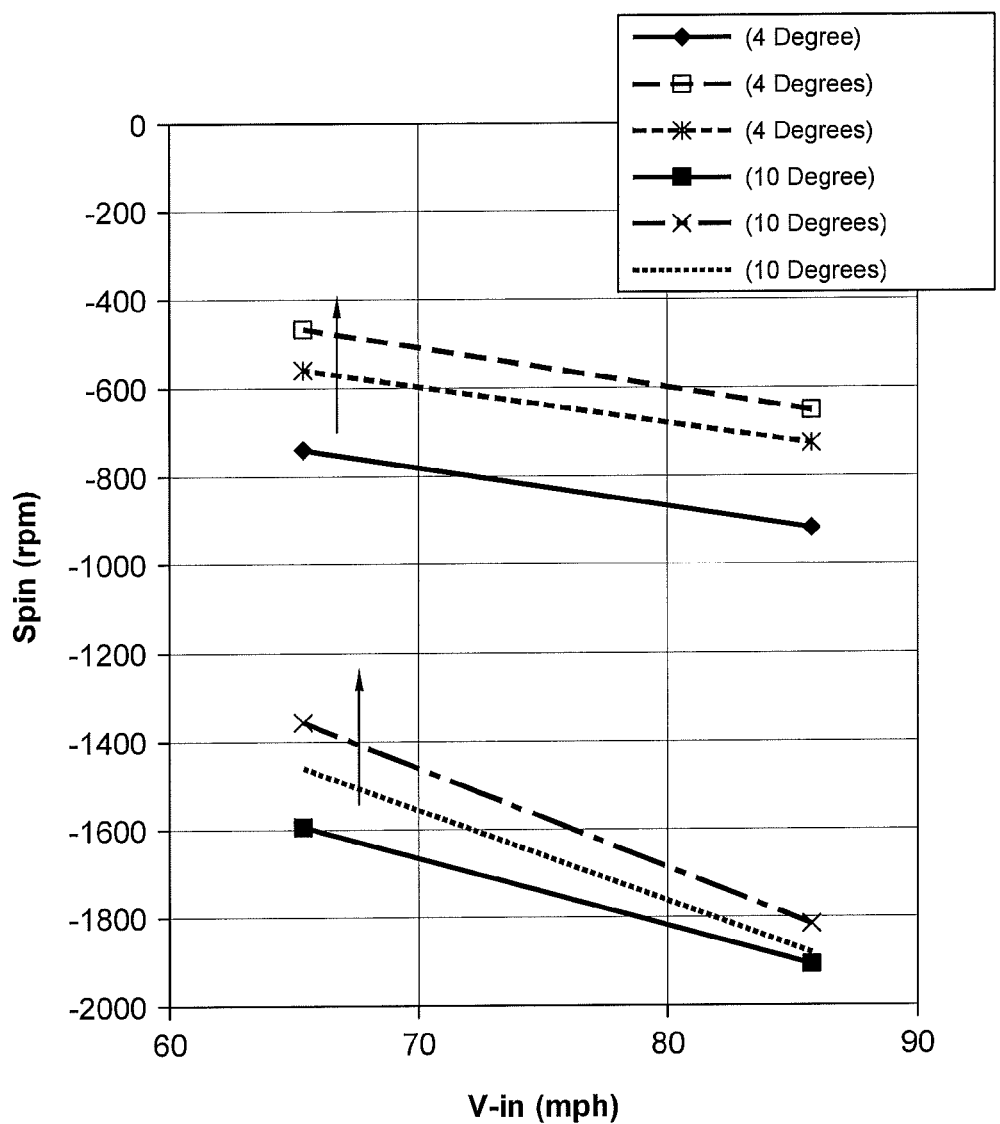
FIG. 18 is a graph of ball spin (y-axis) in rotations per minute versus incoming velocity (x-axis) in miles per hour for multiple material faces having a matrix layer.

As shown in FIGS. 17 and 18, a polymer layer 40 with a reinforcement structure 50 can increase COR and reduce spin.

Figure 3:
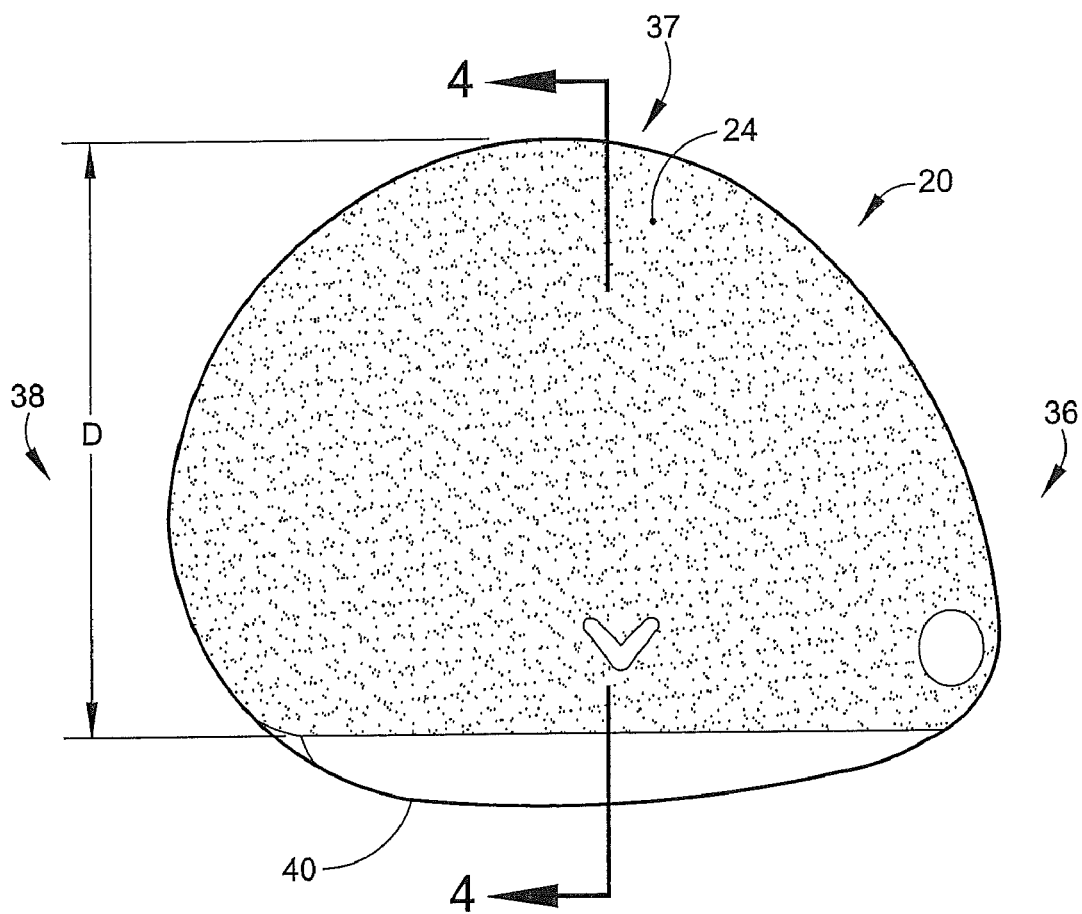
FIG. 3 is a top view of the wood-type golf club head of FIG. 1.
Figure 8:
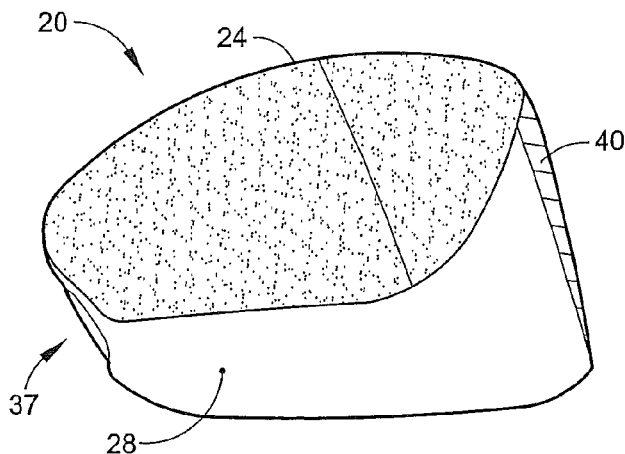
FIG. 8 is a toe-side view of the wood-type golf club head of FIG. 1.
Figure 9:
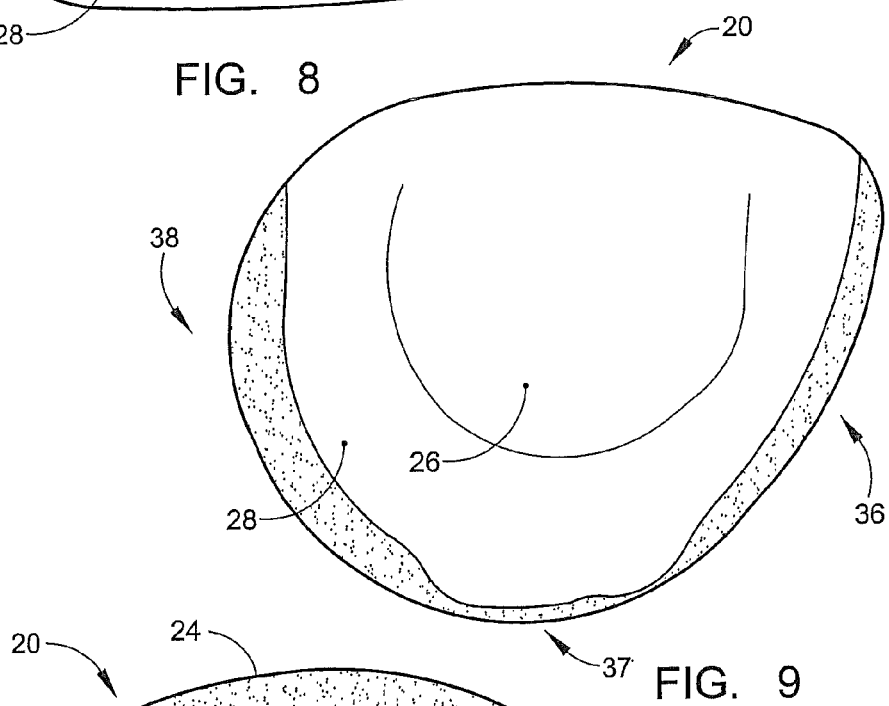
FIG. 9 is a bottom plan view of the wood-type golf club head of FIG. 1.
Figure 10:
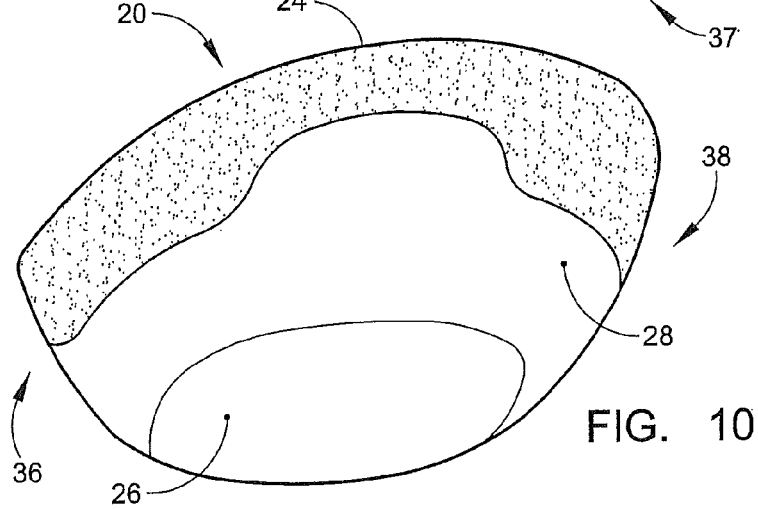
FIG. 10 is a bottom perspective view of the wood-type golf club head of FIG. 1.

As shown in FIG. 3, the depth, "D", of the club head 20 from the front wall 30 to the aft-end 37 preferably ranges from 3.0 inches to 4.5 inches, and is most preferably 3.75 inches. As shown in FIG. 2, the height, "H", of the club head 20, as measured while in address position, preferably ranges from 2.0 inches to 3.5 inches, and is most preferably 2.50 inches or 2.9 inches. The width, "W", of the club head 20 from the toe end 38 to the heel end 36 preferably ranges from 4.0 inches to 5.0 inches, and more preferably 4.7 inches.

a. The face 45 of the golf club head 20 preferably has a large aspect ratio. The aspect ratio as used herein is defined as the height, "H", of the face 45 divided by the width, "W", of the face 45. The width, W, is measured between the farthest limits of the face 45 from the heel end 36 to the toe end 38. The measured width, W, does not include any portion of the body 22 that may be on the front of the club head 20 but not part of the face 45. The face 45 includes the front wall 30 and matrix layer 40. The height, H, is measured from between the farthest limits of the face 45 from the crown 24 to the sole 26. As with the width, W, the height, H, does not include any portion of the body 22 that may be on the front of the club head 20 but not part of the face 45.

In one embodiment, the width W is 3.35 inches and the height H is 2.0 inches giving an aspect ratio of 0.6. The face 45 of the golf club head 20 preferably has an aspect ratio that is greater than 0.575. The aspect ratio of the face 45 preferably ranges from 0.575 to 0.8, and is most preferably from 0.6 to 0.7. A discussion of the aspect ratio of the face of a golf club head is disclosed in Kosmatka, U.S. Pat. No. 6,338,683 for Striking Plate For A Golf Club Head, which is hereby incorporated by reference in its entirety.

The center of gravity and the moments of inertia of the golf club head 20 may be calculated as disclosed in U.S. Pat. No. 6,607,452, entitled High Moment Of Inertia Composite Golf Club, and hereby incorporated by reference in its entirety. In general, the moment of inertia, Izz, about the Z axis for the golf club head 20 will preferably range from 2700 g-cm² to 4000 g-cm², more preferably from 3000 g-cm² to 3800 g-cm². The moment of inertia, Iyy, about the Y axis for the golf club head 20 will preferably range from 1500 g-cm² to 3500 g-cm².

Further, the golf club head 20 preferably has superior products of inertia wherein at least one of the products inertia, Ixy, Ixz and Iyz, of the golf club head 20 has an absolute value less than 100 g-cm², and more preferably two or three products of inertia, Ixy, Ixz and Iyz, of the golf club head 20 have an absolute value less than 100 g-cm². A discussion of the products of inertia is disclosed in Cackett, et al., U.S. Pat. No.

6,425,832 for Large Volume Driver Head With High Moments Of Inertia, which is hereby incorporated by reference in its entirety.

Figure 19:
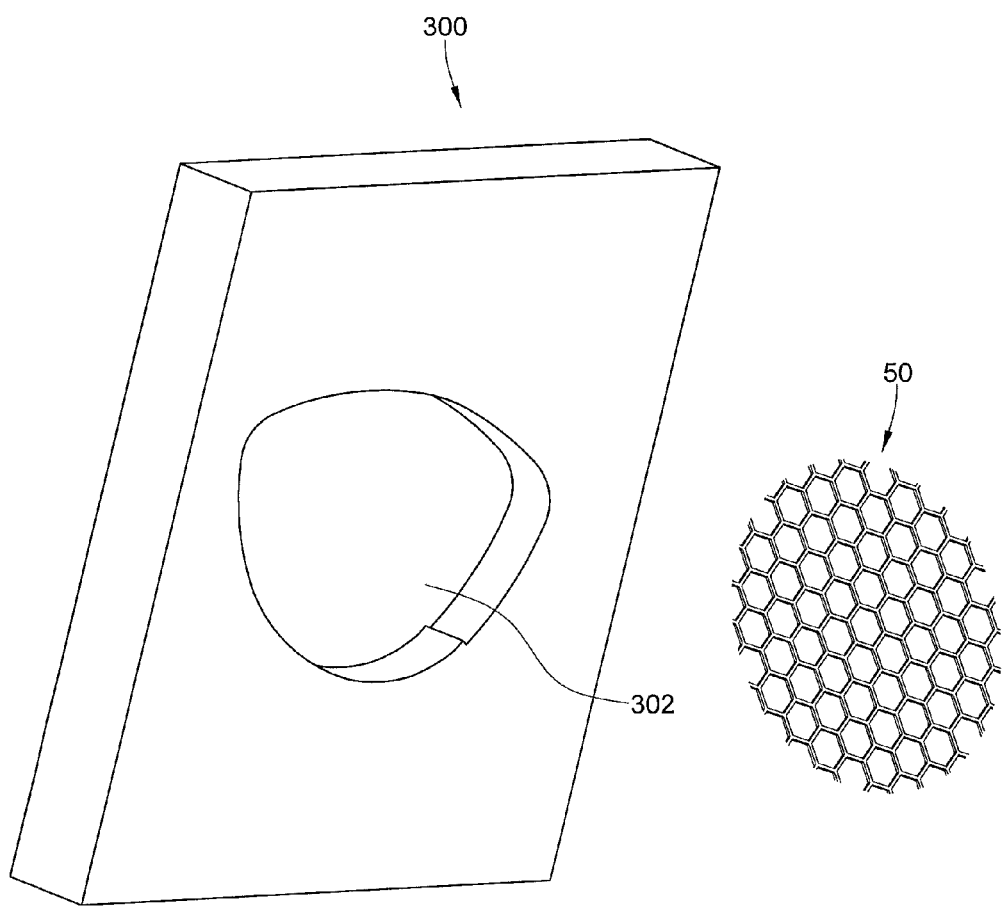
FIG. 19 is an isolated view of a mold and reinforcement structure used in manufacturing a polymer layer with a reinforcement structure.

FIG. 19 illustrates a mold 300 and reinforcement structure 50 used in a method of forming a polymer layer 40 with a reinforcement structure 50. The reinforcement structure 50 is placed within a recess 302 of the mold 300. An injectable polymer material is then injected into each cell of the reinforcement structure 50. The material viscosity of the injectable polymer material is preferably 5 grams per 10 minutes to 25 grams per 10 minutes. The injection pressure preferably ranges from 800 to 2000 pounds per square inch. The reinforcement structure 50 is preferably held within the recess 302 with a bracing resin, which is preferably composed of the same material of the injectable polymer material. The materials disclosed above are preferably utilized as the injectable polymer material.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims Therefore, the embodiments of the invention in which an exclusive property or privilege is claimed are defined in the following appended claims.

We claim as our invention:

1. A wood-type golf club head comprising:
a body comprising a crown, a sole and a front wall, the body having a hollow interior, the body composed of a titanium alloy material, the body having a volume ranging from 300 cubic centimeters to 450 cubic centimeters;
wherein a face of the golf club head has an aspect ratio greater than 0.575;
wherein the golf club head has a width extending from a toe end to a heel end ranging from 4.0 inches to 5.0 inches;
wherein the golf club head has a height extending from the sole to the crown ranging from 2.0 inches to 3.5 inches;
wherein the golf club head has a coefficient of restitution value ranging from 0.835 to 0.855 and a characteristic time value of less than 257 milliseconds under the standard USGA Pendulum Test.

2. The wood-type golf club head according to claim 1 wherein the front wall comprises a non-metal layer disposed on an exterior surface of a metal face wall, the non-metal layer having a thickness ranging from 0.010 inch to 0.250 inch.

3. The wood-type golf club head according to claim 2 wherein the non-metal layer is composed of a material selected from the group consisting of thermoplastic polyurethane, polyether block copolymer, ionomer, nylon, polyamide and polypropylene.

4. The wood-type golf club head according to claim 2 wherein the non-metal layer has a thickness ranging from 0.080 inch to 0.120 inch.

5. The wood-type golf club head according to claim 1 wherein the golf club head has a moment of inertia, Izz, about the Z axis through the center of gravity of the golf club head that ranges from 2700 g-cm$^2$ to 4000 g-cm$^2$.

* * * * *